(No Model.)　　　　　　　　　　　　　　　　　　　　2 Sheets—Sheet 1.
L. S. BUTT.
CULTIVATOR.
No. 505,506.　　　　　　　　　Patented Sept. 26, 1893.
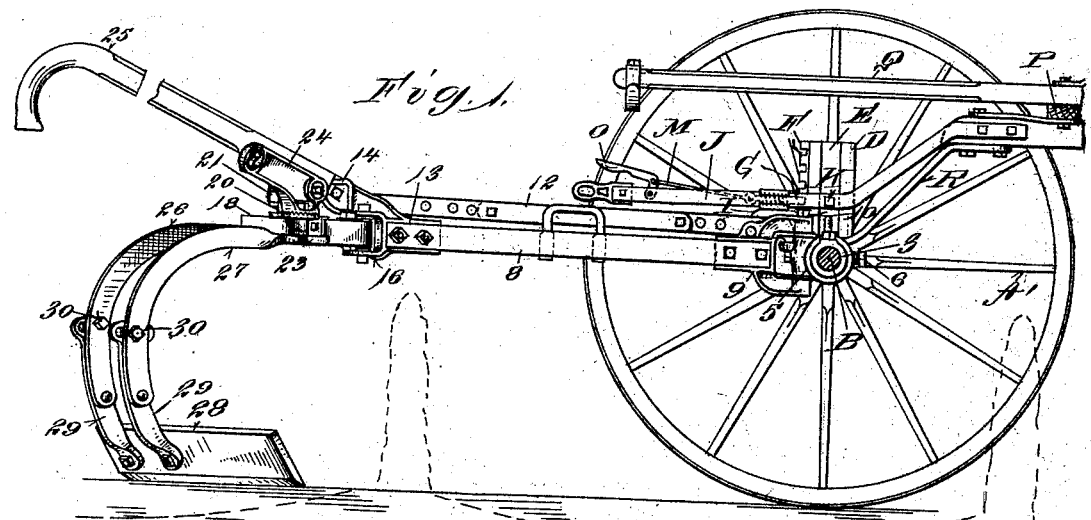
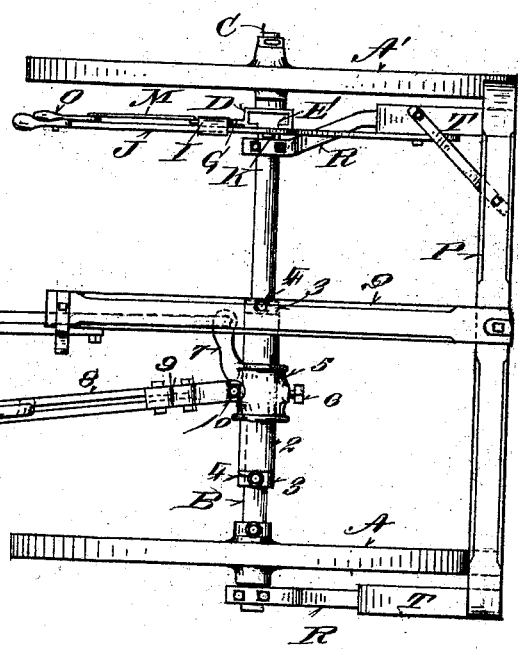
WITNESSES
Jas. C. Dawley
W. McGraw
INVENTOR
Leroy S. Butt,
By H. A. Toulmin,
ATTORNEY.

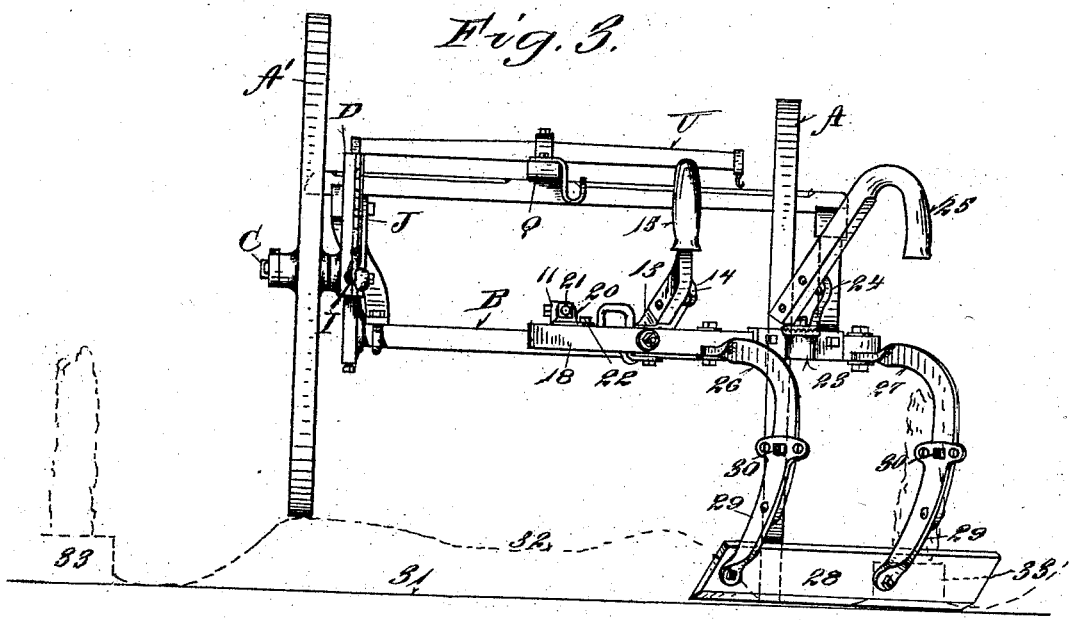
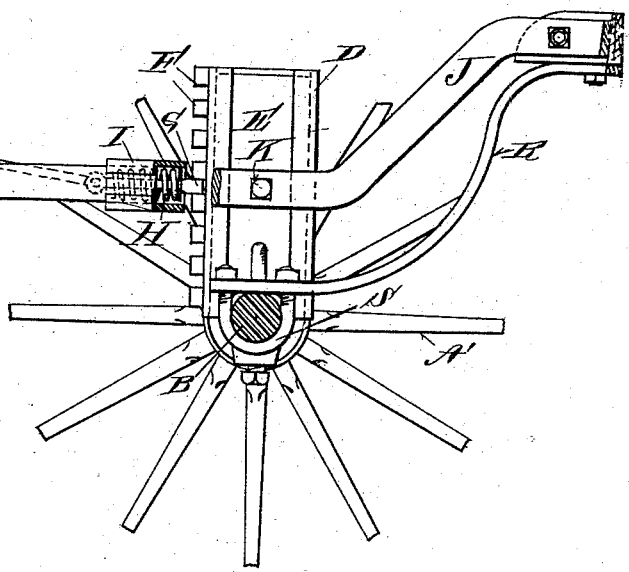

United States Patent Office.

LEROY S. BUTT, OF NORTH EAST, PENNSYLVANIA, ASSIGNOR TO THE P. P. MAST & COMPANY, OF SPRINGFIELD, OHIO.

CULTIVATOR.

SPECIFICATION forming part of Letters Patent No. 505,506, dated September 26, 1893.

Application filed June 19, 1893. Serial No. 478,090. (No model.)

*To all whom it may concern:*

Be it known that I, LEROY S. BUTT, a citizen of the United States, residing at North East, in the county of Erie and State of Pennsylvania, have invented certain new and useful Improvements in Grape-Vine Cultivators, of which the following is a specification, reference being had therein to the accompanying drawings.

My invention relates to certain new and useful improvements in grape cultivators, being an implement used for the cultivation of grape vines. In raising grapes on a commercial scale it is usual to plant the vines in rows, generally about eight to ten feet apart, the vines being supported by vine-sticks. To obtain the best results it is necessary to cultivate the soil from time to time to keep it clear of weeds and grass or other fungus growth, which tend to check the grape vines, and to properly do this work it is necessary that the tiller shall be able to turn over the ground practically all around each hill or vine, but to do this economically it must be accomplished by merely cultivating down one side of the hills and up the other, without operating in a cross direction. Therefore the implement must be adapted to swing laterally and easily beyond or across the line of the row of hills and back again out of the line and closely around each vine as it is approached so as to remove the soil all around each individual hill by merely passing down one side and up the other.

My improved implement embodying this invention carries out this work in practice successfully as I have ascertained by field use. Its peculiarities will be hereinafter fully described and particularly pointed out in the claims.

In the accompanying drawings on which like reference letters and figures indicate corresponding parts: Figure 1, represents a side elevation of my improved cultivator; Fig. 2, a plan view thereof; Fig. 3, a rear view, and Fig. 4, a partial section and partial side view in detail on a larger scale.

The letters A and A' designate any approved type of wheels, one of which, A carries an axle B, while A' carries a spindle C to which is attached a standard D. In this standard is mounted a slide E to which the adjacent end of the axle B is secured. The slide being adjustable up and down in the standard, it will be seen that the axle may be raised and lowered above and below the center of the wheel A'. This is done in order to compensate for the difference in the position of the two wheels when one is running on the ridge and the other in a furrow, as suggested in Fig. 3, and as will be hereinafter more fully described.

The standard D is provided with notches or teeth F into which is engaged the bolt G actuated by a spring H, in a sleeve I carried by a lever J, connected to the slide E at K and pivoted to a suitable part of the thill frame. A rod M and hand piece O serve to withdraw the bolt G from a notch while the lever J is manipulated up and down to raise or lower the axle to the point desired.

The thill frame consists of a cross bar P, a center bar Q, curved connecting bars R attached to the axle by clips S, or other suitable means, and shafts or thills proper T, within which latter the draft animal is hitched. A singletree is carried, as seen at U in Fig. 3. To the rear of this vehicle is attached the cultivating instrumentalities or gangs. On the axle is placed a sleeve 2, held in the adjusted place by collars 3 having set screws 4. On this sleeve is placed a hub 5 fixed to the collar by a set screw 6 and provided with an arm 7. A beam 8 is coupled by a yoke 9, to which it is attached, to the hub 5 by a coupling bolt 10, which gives the beam free lateral motion. A brace rod made in overlapping sections 11 and 12 pivots at one end to the arm 7, and one section having a series of holes, as seen in Fig. 1, the sections may be overlapped more or less to vary its length.

To the rear of the beam 8 is secured a bracket 13 having a projection 14 to which is attached a handle 15. This bracket forms a jaw 16, as seen in Fig. 1, in which is mounted a bracket 17 carried by the shovel bar 18, a coupling bolt 19 forming a pivotal connection between the two brackets and hence between the beam 8 and the bar 18. A clip 20 on the bar 18 receives one of the sections to the brace rod, which is threaded at that end and provided with lock nuts 21, whereby a slight adjustment may be made and then the parts fixed. A bolt 22 which secures the clip 20 permits a slight movement of the clip to compensate for the change of angle between the brace rod and the shovel bar when the beam is swung either way.

To the shovel bar 18 is attached another bracket 23, and to it is secured the casting 24 of the handle 25. By preference the contact between the bracket 23 and casting 24 is serrated, as seen in Fig. 2, to assist in holding the handle more firmly.

To the shovel bar 18 are attached shovel standards 26 and 27 and to them is secured a shovel 28 by means of pivoted sections 29 held by break-pins 30.

I will now describe the operation of my improved machine. Looking at Fig. 3 will be seen two rows of vines. The full line 31 designates the ground surface in an unbroken condition. The dotted lines 32 indicate the position of the soil after the first breaking has been done. For this purpose the usual share and land side plow is used, making a furrow alongside each row and throwing the soil between the rows, going down one side and up the other. This leaves a strip of soil, undisturbed, from hill to hill, as suggested at 33. It is now that resort is had to my improved implement. One wheel is run into the furrow and the other on the ridge. The lever J is then manipulated until the axle B is let down to nearly a horizontal position at the height of the hub of the lower wheel. Then in order to tip the shovel enough to cause the outer corner to be raised, so that it will readily take into the soil, though hard, the axle is lifted slightly at its adjustable end. It will now be seen that by taking hold of the handles and swinging the shovel bar to the position shown in Fig. 2 the blade 28 will reach out fully across the unplowed bank or ridge 33 and cut it away, throwing it more or less into the furrow at the left, as viewed in Figs. 2 and 3. As the shovel-bar 18 or shovel nears a grape vine the beam is swung inwardly so as to clear it, and as the vine is passed it is swung outwardly so as to cut away the ridge in advance of the next vine. After this operation has been performed it is usual to take the ordinary plow and throw more or less of the ridge 32 back into the place formed by the shovel of my implement, such latter application of the ordinary plow tending to bank the soil slightly about the vines. At a later stage in the cultivation resort is again had to my implement for the purpose of removing this soil so thrown up, and at the same time practically leveling off the ground between the rows. It is absolutely necessary to keep the wheels to one side of the rows so as not to in the least disturb the vines and the coming fruit. But while this is true it is just as necessary to cultivate in between the succeeding vines as at the sides of them. This requires that the shovel shall be capable of manipulation well to one side of the wheel nearest the row, and shall be easily swung in and out so as not to break down the vines. Again, as the resistance of the shovel by the soil is at a point outside of the draft lines of the machine, the natural tendency would be to create a side draft which would interfere with the draft animal and would tend to tire him and to make him depart from a straight line. This tendency I have practically overcome by the arrangement of the beam and brace-rod in connection with the shovel-bar 18, and the point of attachment to the axle near the center, which this arrangement permits. It will be noticed that the tendency of the outer end of the shovel-bar is to swing back and the tendency of the inner end is to swing forward. Thus the strains are rearward on the beam 8 and are forward on the brace-rod. It will also be noticed that as the outer end of the shovel beam reaches laterally beyond the wheel, and so supports the shovel well off to one side, the beam 8 may be attached to the axle at a point not remote from its middle or center. Hence the strains on the axle are not sufficiently far to one side of the center, by this arrangement, to produce any material side draft.

In practice I have ascertained that the angle of the shovel to the line of travel tends by the action of the soil to draw the shovel beam outward to about the same extent that the beam 8 tends to draw into a line straight with the draft. Thus this extreme lateral position of the shovel becomes a natural one, from which there is no tendency to depart. Consequently, as I have also ascertained in the field, it requires but the slightest effort on the part of the operator to manipulate the beam sidewise so as to run the shovel in and around the vines.

A hook on the center frame piece Q serves to hang the gang upon when not in use.

While I have shown and described a wheel-vehicle, and wheels are greatly preferred, still a vehicle running on runners or supported otherwise than by wheels is within the meaning of the term vehicle as used in this specification.

Having thus fully described my invention, what I claim as new, and desire to secure by Letters Patent, is—

1. In a vine cultivator, the combination with a vehicle of a draft beam attached thereto near its middle, a shovel beam carried by said draft beam and extending laterally beyond it, a shovel carried by such extended end and means to hold the shovel beam against strains arising from the shovel, the said lateral extension of the shovel beam permitting the point of attachment of the draft beam to be near the middle of the vehicle.

2. In a vine cultivator, the combination with a vehicle, of a draft beam attached thereto near its middle, the means of attachment being adjustable up and down to tilt the shovel, a shovel beam attached to said draft beam and extending laterally therefrom, a shovel carried by such lateral extension, and means to hold the shovel beam against the strains arising from the shovel.

3. In a vine cultivator, the combination with a vehicle, its axle adjustable up and down at one end, of a draft beam attached to the axle near its middle, a shovel beam attached to said draft beam and extending laterally beyond it, a shovel carried by such lateral extension, and a brace to hold the shovel beam against the strains arising from the shovel.

4. In a vine cultivator, the combination with a vehicle, its axle adjustable up and down at one end a draft beam and brace rod attached to said axle near its middle, a shovel beam pivoted to the draft beam and extending laterally beyond it at both sides, a shovel carried by one of said lateral extensions and a connection between the other extension and the said brace-rod.

5. In a vine cultivator, the combination with the frame, two wheels, an axle carried by one of them, a slide carried by the axle, a spindle and standard carried by the other wheel, a slide fitting said standard, and a lever and locking device to operate the slide and unlock it, of a cultivating gang attached to the axle and adapted to have one end of the shovel raised above the other end by adjusting the said slide upward.

6. In a vine cultivator, the combination with a wheeled vehicle, an axle carried by one wheel and adjustable up and down at the other end with respect to the other wheel, a draft beam and a brace rod attached to the axle and adapted to be tipped by the adjustment of the axle up or down, a shovel beam pivoted to the said draft beam and extending laterally beyond it at both sides, a shovel attached to the outer lateral extension of the shovel beam, and a connection between its inner extension and said rod, and suitable handles to manipulate the beam laterally and up and down.

In testimony whereof I affix my signature in presence of two witnesses.

LEROY S. BUTT.

Witnesses:
R. S. PIERCE,
GEO. W. COLE.